(12) United States Patent
Suzuki

(10) Patent No.: US 6,433,858 B1
(45) Date of Patent: Aug. 13, 2002

(54) AUTOFOCUSING APPARATUS OF A SIGHTING TELESCOPE

(75) Inventor: Shinichi Suzuki, Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/417,622

(22) Filed: Oct. 14, 1999

(30) Foreign Application Priority Data

Oct. 14, 1998 (JP) ............................................ 10-291955

(51) Int. Cl.[7] .............................. G01C 3/00; G02B 7/04
(52) U.S. Cl. ................ 356/3.08; 250/201.4; 250/201.6; 356/3.01; 356/4.01
(58) Field of Search .............................. 356/3.01, 3.08, 356/4.01; 396/106, 89, 111; 250/201.4, 201.6

(56) References Cited

U.S. PATENT DOCUMENTS

| | | | |
|---|---|---|---|
| 4,162,426 A | * | 7/1979 | Tsunekawa et al. |
| 4,303,335 A | * | 12/1981 | Matsuda et al. |
| 5,740,477 A | * | 4/1998 | Kosako et al. ............... 396/101 |
| 5,796,517 A | | 8/1998 | Sensui et al. |
| 5,844,231 A | | 12/1998 | Suzuki et al. |
| 5,872,661 A | | 2/1999 | Suzuki et al. |
| 5,877,892 A | | 3/1999 | Nakamura et al. |

* cited by examiner

Primary Examiner—Stephen C. Buczinski
(74) Attorney, Agent, or Firm—Greenblum & Bernstein, P.L.C.

(57) ABSTRACT

An autofocusing apparatus of a telescope for automatically focusing on an object viewed within a field of view of the telescope through a distance-measuring zone arranged in the field of view, includes: a multi-point distance measuring device which divides the distance-measuring zone into at least three distance-measuring zones to detect an object distance on each of the distance-measuring zones; a lens driver which drives a focusing lens group of the telescope along an optical axis thereof; and a controller which controls the lens driver wherein the focusing lens group is moved to perform an autofocusing operation in accordance with a result of the each object distance detected by the multi-point distance measuring zones. The controller compares the each object distance detected by the multi-point distance measuring device with each other. If the controller determines that two object distances respectively detected on two distance-measuring zones among the aforementioned at least three distance-measuring zones are substantially the same, the two distance-measuring zones being separate from each other by at least one distance-measuring zone positioned therebetween, and that an object distance detected on one of the at least one distance-measuring zone is substantially double the distance of each of the two object distances which are substantially the same, the controller determines that each of the two object distances is a valid object distance so that the autofocusing operation is performed in accordance with the valid object distance.

8 Claims, 11 Drawing Sheets

AUTOFOCUSING APPARATUS OF A SIGHTING TELESCOPE

BACKGROUND OF THE INVENTION

1. Field of the Invention

The present invention relates to an autofocusing apparatus suitable for a sighting telescope incorporated in a surveying instrument such as an automatic level, a transit, a theodolite, etc.

2. Description of the Related Art

A conventional surveying instrument such as an automatic level (auto-level), a transit, a theodolite, etc., is generally provided with a sighting telescope, a level and a measuring device which measures a rotational angle, a descending angle, and an ascending angle, etc. When this type of surveying instrument is used, the sighting telescope is positioned horizontally and subsequently the horizontal and vertical adjustments for the sighting telescope are performed. Thereafter, the sighting telescope is aimed at a reference object or a reference point so that the reference object is sighted by a surveyor.

For instance, the optical system of the sighting telescope of an automatic level includes an objective lens group, a focusing lens group and an eyepiece, arranged in that order from the object side. The position of the focusing lens group is adjusted depending on the object distance, so as to form a sharp object image on the reticle provided on the focal plane. The object image formed on the reticle can be viewed through the eyepiece.

In a conventional sighting telescope provided with an autofocusing system, immediately after the AF start button of the autofocusing system is depressed by the user, the focusing lens group of the system is driven from a current position (e.g., initial position) to another position to bring a sighting object into focus. According to a phase-difference detection AF system, a focal point which is firstly detected by the AF system is regarded as an actual focal point for the sighting object, so that the AF system drives the focusing lens group to an axial position thereof which corresponds to the initially detected focal point to stop the focusing lens group thereat.

According to such an autofocusing control performed by the autofocusing system of a conventional sighting telescope, when auto-focusing the telescope on a prism such as a corner-cube reflector, either the frame which supports the prism or a telescope's image reflected off the prism is brought into focus. In other words, it is unreliably determined as to which of the two images (an image of the frame or an image of the telescope) is brought into focus by the autofocusing system. Specifically when the telescope is seen from the front, the front face of the objective lens of the telescope tends to be seen as a dark image while the contrast of the frame of the telescope is generally high, so that the telescope is often auto-focused mistakenly on an image of itself reflected off the prism, rather than the corner-cube reflector or corner-cube prism.

SUMMARY OF THE INVENTION

The primary object of the present invention is to provide an autofocusing apparatus of a sighting telescope which makes it possible to reliably focus the telescope on a sighting object, and in particular, a prism such as a corner-cube reflector.

To achieve the object mentioned above, according to an aspect of the present invention, there is provided an autofocusing apparatus of a telescope for automatically focusing the telescope on an object viewed within a field of view of the telescope through a distance-measuring zone arranged in the field of view, the autofocusing apparatus including: a multi-point distance measuring device which divides the distance-measuring zone into at least three distance-measuring zones to detect an object distance on each of the distance-measuring zones; a lens driver which drives a focusing lens group of the telescope along an optical axis thereof; and a controller which controls the lens driver so that the focusing lens group is moved to perform an auto-focusing operation in accordance with a result of the each object distance detected by the multi-point distance measuring zones. The controller compares the each object distance detected by the multi-point distance measuring device with each other. If the controller determines that two object distances respectively detected on two distance-measuring zones among the aforementioned at least three distance-measuring zones are substantially the same, the two distance-measuring zones being separate from each other by at least one distance-measuring zone positioned therebetween, and that an object distance detected on one of the at least one distance-measuring zone is substantially double the distance of each of the two object distances which are substantially the same, the controller determines that each of the two object distances is a valid object distance so that the autofocusing operation is performed in accordance with the valid object distance.

Preferably, if there are no object distances detected on the aforementioned at least one distance-measuring zone which are substantially double the distance of each of the two object distances, the controller determines the shortest object distance among all of the object distances detected by the multi-point distance measuring device as a valid object distance so that the autofocusing operation is performed in accordance with the shortest object distance.

Preferably, the autofocusing apparatus is incorporated in a surveying instrument.

Preferably, there is further provided a memory in which the object distances measured by the multi-point distance measuring device are temporarily stored.

Preferably, the multi-point distance measuring device includes a phase-difference detection AF sensor.

Preferably, the phase-difference detection AF sensor includes a pair of line sensors.

Preferably, any two adjacent distance-measuring zones among the at least three distance-measuring zones overlap each other by a predetermined amount.

Preferably, the distance-measuring zone extends horizontally along the field of view of the telescope.

The present disclosure relates to subject matter contained in Japanese Patent Application No. 10-291955 (filed on Oct. 14, 1998) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
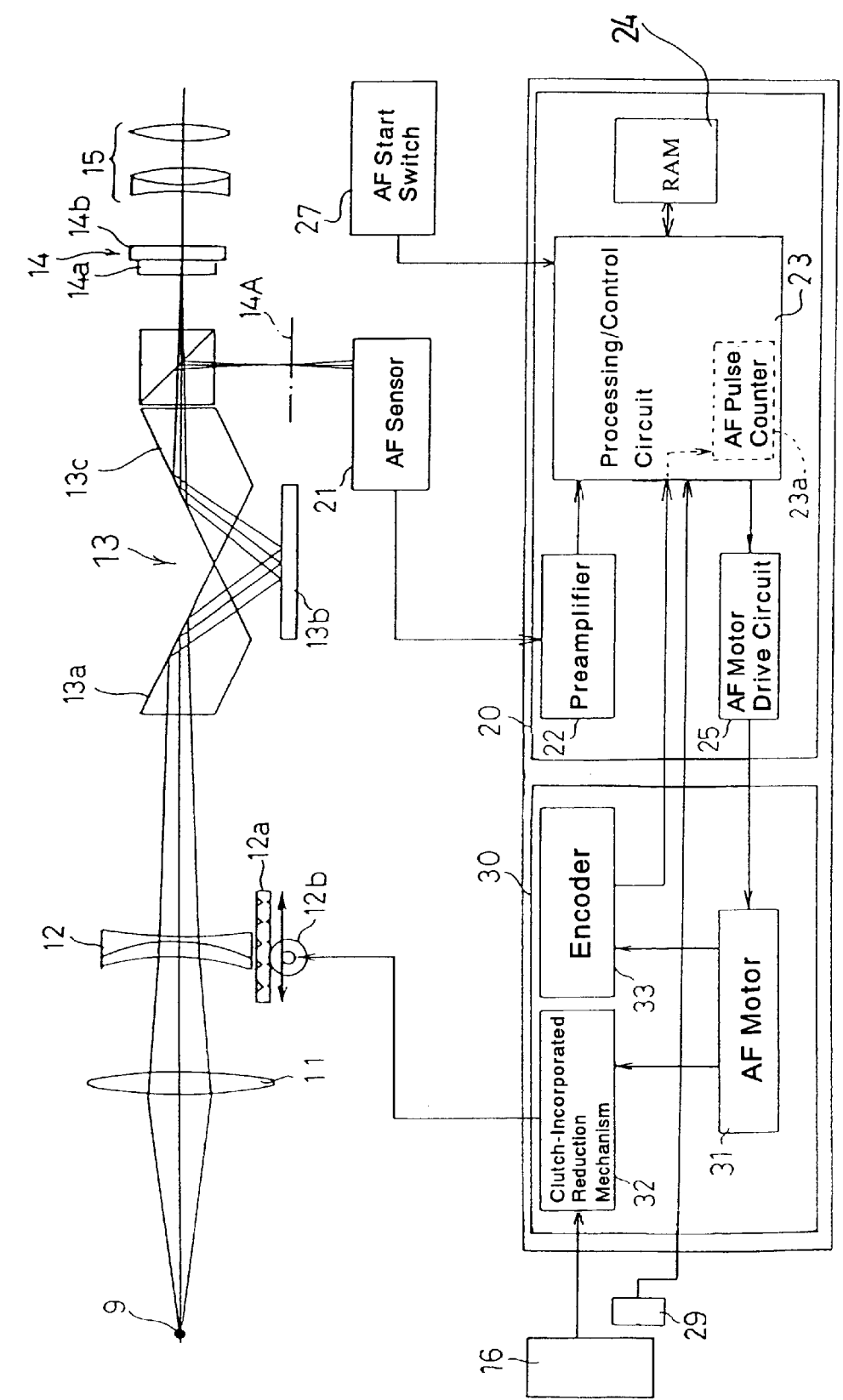
FIG. 1 is a schematic diagram showing fundamental elements of an embodiment of an automatic level to which the present invention is applied.

FIG. 1 shows an embodiment of an automatic level to which the present invention is applied. The automatic level (surveying apparatus) 10 is provided with a telescopic optical system (sighting telescope) which includes a positive objective lens group 11, a negative focusing lens group 12, a horizontal compensating optical system 13, a focusing plate (focal plane) 14, and a positive eyepiece lens 15, in that order from the object side (i.e., left to right in FIG. 1). The focusing plate 14 is composed of a first plate 14a and a second plate 14b.

The horizontal compensating optical system 13, per se known, is provided with a first compensating prism 13a, a compensating mirror 13b and a second compensating prism 13c, and has a symmetrical shape with respect to the center of the compensating mirror 13b. The horizontal compensating optical system 13 hangs from a cord/string (not shown) attached to a shaft (not shown).

The absolute angles between the compensating mirror 13b and the first and second compensating prisms 13a and 13c are the same; however, the signs (i.e., "+" or "−") of the actual angles thereof are opposite. The angle of the compensating mirror 13b relative to either compensating prism can be, for example, thirty degrees (30°). This angle varies depending on predetermined factors such as the length of the above-mentioned cord/string from which the horizontal compensating optical system 13 hangs. If the automatic level is set with an optical axis O of the objective lens group 11 and the focusing lens group 12 extending almost horizontally but being slightly inclined to a real horizontal plane by an angle of ten to fifteen minutes, the light beam that is passed through the objective lens group 11 and the focusing lens group 12 to be incident on the first compensating prism 13a is also inclined to the real horizontal plane by the same angle. However, the light beam that emerges from the second compensating prism 13c after having been reflected by the first compensating prism 13a, the compensating mirror 13b and the second compensating prism 13c, has substantially no inclination relative to the real horizontal plane.

A rack 12a is fixed to the focusing lens group 12, while a pinion 12b is engaged with the rack 12a, so that rotating the pinion 12b causes the focusing lens group 12 to move along the optical axis O via the rack 12a. Therefore, the image of an object (sighting object) 9 that is formed through the objective lens group 11 and the focusing lens group 12 can be moved along the optical axis by rotating the pinion 12b. The user of the automatic level 10 sights the image of the object 9 which is focused on the focusing plate 14, together with a reticle formed on the focusing plate 14.

The automatic level 10 is provided between the second compensating prism 13c and the focusing plate 14 with a beam splitter (half-mirror) 18 that splits a bundle of light incident thereon into two light bundles. Part of the light emitted from the horizontal compensating optical system 13 is reflected by the beam splitter 18 at right angles towards a focus detecting sensor (AF sensor) 21 provided near the beam splitter 18. Between the beam splitter 18 and the focus detecting sensor 21 is formed a reference focal plane 14A which is located at a position optically equivalent to the position at which the focusing plate 14 is placed.

The automatic level 10 is further provided with a focus state detecting system 20 and a focusing lens group driving system 30. The focus state detecting system 20 detects the focus state on the reference focal plane 14A via the AF sensor 21 which is positioned in the vicinity of the reference focal plane 14A. The focusing lens group driving system 30 controls the focusing lens group 12 to move along the optical axis 0 in accordance with the signals received from the focus state detecting system 20.

Figure 10:
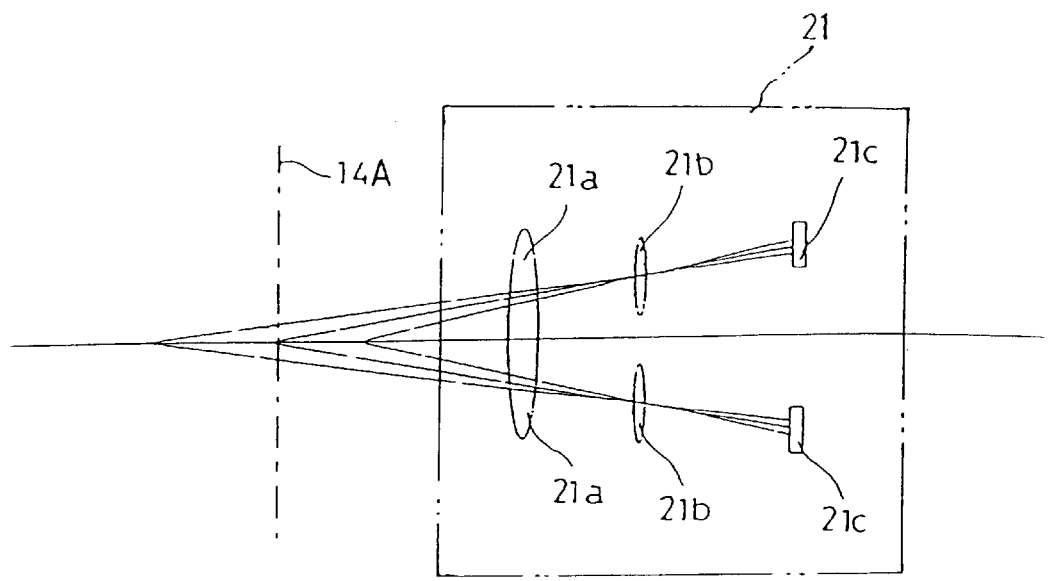
FIG. 10 is an explanatory view of an AF sensor of the automatic level shown in FIG. 1.

The focus state detecting system 20 includes a preamplifier 22, a processing/control circuit (controller) 23, a RAM (memory) 24 and an AF-motor drive circuit 25. The focusing lens group driving system 30 includes an AF motor 31, a clutch-incorporated reduction mechanism 32 and an encoder 33. The focus state detecting system 20, the structure thereof being known in the art, detects the focus state (in-focus or out-of-focus state, front or rear focus, and amount of defocus) in accordance with the signals output from the AF sensor 21. In this embodiment the AF sensor 21 is a phase-difference detection photosensor and includes a condenser lens 21a, a pair of separator lenses (a pair of imaging lenses) 21b, and a pair of line sensors (e.g., multi-segment CCD sensors) 21c located behind the respective separator lenses 21b (see FIG. 10). The pair of separator lenses 21b are arranged apart from each other by the base length. The image of the object formed on the reference focal plane 14A is separated into two by the pair of separator lenses 21b to be respectively formed on the pair of line sensors 21c. The position of incident light of the object image on each line sensor 21c varies depending on the focus state of the object image on the reference focal plane 14A. Namely, that position varies in the following three cases: the first case wherein an image of the object 9 is precisely focused on the reference focal plane 14A, the second case wherein an image of the object 9 is focused on a plane in front of the reference focal plane 14A (i.e., a front focus state), and the third case wherein an image of the object 9 is focused on a plane behind the reference focal plane 14A (i.e., a rear focus state). The amount of deviation of a focal point relative to the reference focal plane 14A (i.e., the amount of defocus) can be determined from the position of the object image formed on each line sensor 21c.

Figure 11:
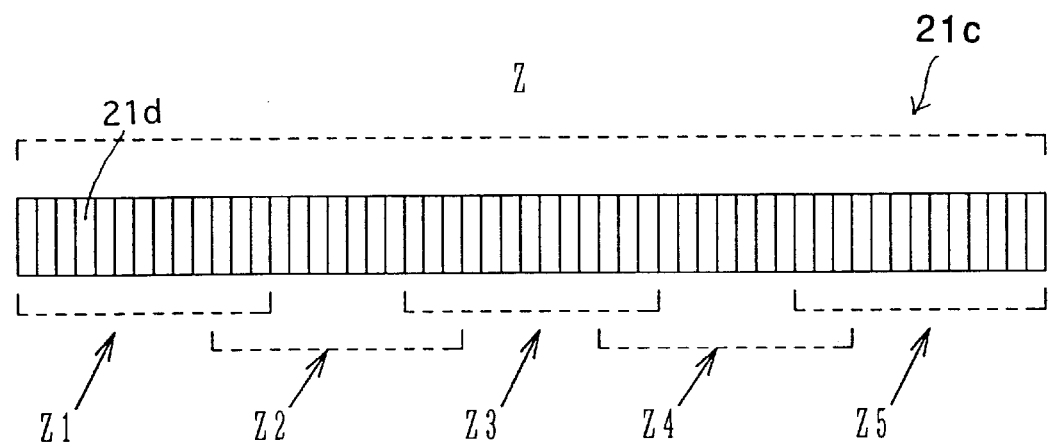
FIG. 11 is a schematic view of one of a pair of multi-segment CCD sensors of the AF sensor shown in FIG. 10.

FIG. 11 shows one of the two line sensors 21c as a reference line sensor. Each line sensor 21c includes an array of photoelectric converting elements 21d. Each photoelectric converting element 21d converts the received light of an image into electric charges which are integrated (accumulated) and output as an integrated electric charge to the preamplifier 22 to constitute AF sensor data. The preamplifier 22 amplifies the input electric charge and outputs the an amplified electric charge to the processing/control circuit 23. The processing/control circuit 23, provided as an element of the focus state detecting system 20, calculates an amount of defocus through a predetermined defocus operation in accordance with the AF sensor data input from the pair of line sensors 21c. Furthermore, in this embodiment, the amount of driving of the AF motor 31 (the number of pulses output from the encoder 33) and the driving direction thereof which are necessary for moving the focusing lens group 12 to an axial position thereof, at which the amount of defocus becomes zero, are respectively calculated and determined in accordance with the amount of defocus calculated by the processing/control circuit 23. The number of AF pulses is registered in an AF pulse counter 23a in the processing/control circuit 23.

The pair of CCD line sensors 21c are arranged in the automatic level 10 so that the longitudinal direction of each line sensor 21c (the horizontal direction as viewed in FIG. 11) extends substantially horizontal on the condition that the telescopic optical system of the automatic level 10 is horizontally placed on the ground. Therefore, each line sensor 21c extends in the right/left direction of the automatic level 10, i.e., in a direction perpendicular to the paper of FIG. 1.

Figure 12:
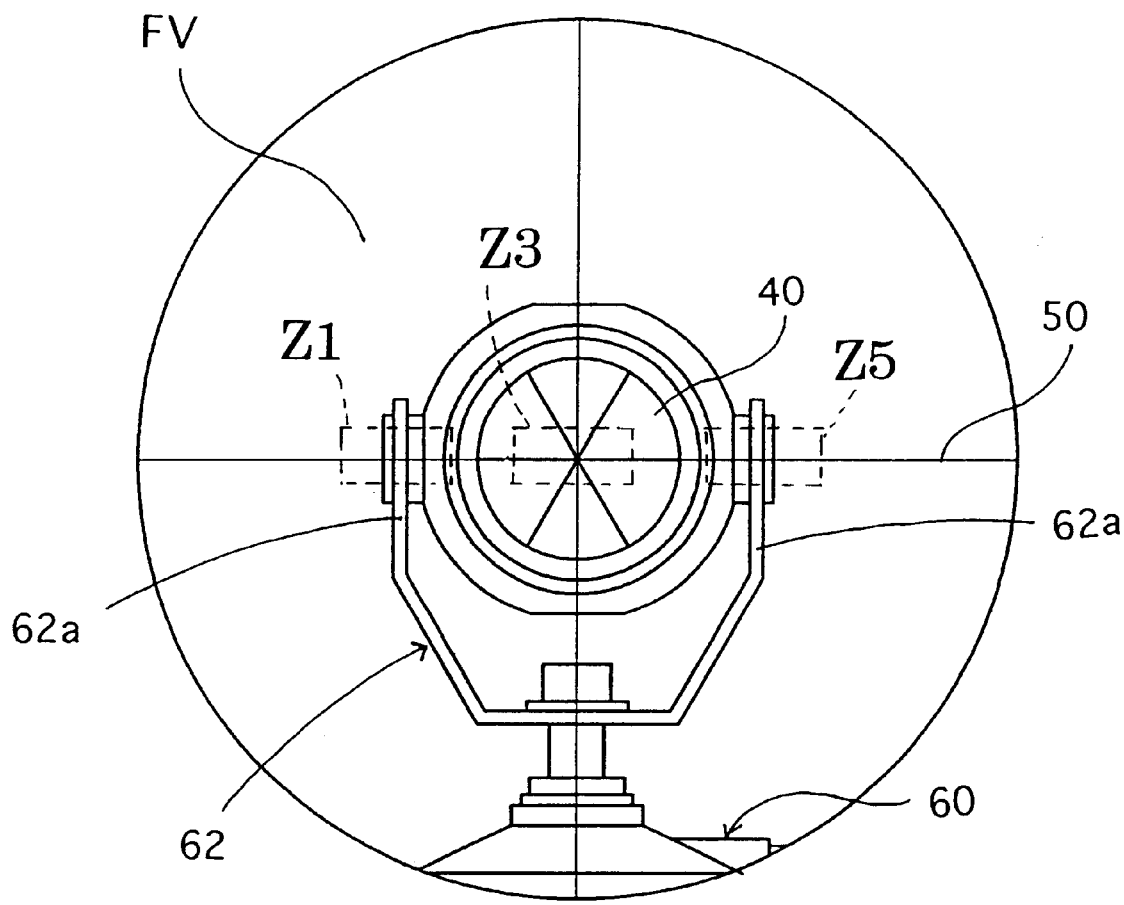
FIG. 12 is a schematic view of a field of view of the sighting telescope of the automatic level shown in FIG. 1, when sighting a corner-cube reflector mounted on a tripod through the telescope.

FIG. 12 shows a field of view FV seen through the sighting telescope (telescopic optical system) of the automatic level 10 when a standard type of corner-cube reflector (prism) 40 positioned at a location away from the automatic level 10 by a predetermined distance (approximately ten meters) is sighted through the telescope. A reticle 50 consisting of two intersecting lines (horizontal and vertical lines) printed on the focusing plate 14 is seen in the circular field of view FV. The corner-cube reflector 40 is mounted on a tripod 60 positioned at a surveying point. In FIG. 12, only the top portion of the tripod 60 is seen in the circular field of view FV.

More specifically, the corner-cube reflector 40 is supported and held by a frame 62 having an U-shape cross section that is fixed at the top of the tripod 60. The frame 62 is provided with a pair of arms 62a which hold the corner-cube reflector 40 therebetween.

When the automatic level 10 is operated to be autofocused on the corner-cube reflector 40 positioned on top of the tripod 60, the automatic level 10 focuses on either a telescope's image reflected on the corner-cube reflector 40, or the frame 62 which supports the corner-cube reflector 40. No problem occurs if the automatic level 10 is focused on the frame 62 because the corner-cube reflector 40 is substantially in-focus. However, there is a problem if the automatic level 10 is focused on a telescope's image reflected on the corner-cube reflector 40 because the autofocusing system of the automatic level 10 determines that the sighting object is positioned away from the automatic level 10 by a distance which is double the distance between the automatic level 10 and the corner-cube reflector 40, which causes the corner-cube reflector 40 to become out of focus.

In order to prevent such a problem from occurring, according to the present embodiment of the automatic level 10, the entire distance-measuring zone positioned in the field of view FV is divided into at least three distance-measuring zones. In FIG. 12, three AF distance-measuring zones Z1, Z3 and Z5 are shown as an example. The distance measuring operation is performed on each distance-measuring zone. If it is judged from the result of the distance measuring operation that the two object distances (each first object distance), respectively measured on two distance-measuring zones which are separate from each other by at least one distance-measuring zone positioned between the two separate distance-measuring zones, are substantially the same as each other, and that the object distance (second object distance), measured on at least one distance-measuring zone positioned between the two separate distance-measuring zones, is substantially double the aforementioned first object distance, the first object distance is regarded as a valid object distance. Accordingly, the autofocusing operation is performed in accordance with the valid object distance. According to such a control method, if the automatic level 10 is aimed at the corner-cube reflector 40 mounted on the tripod 60 to bring the corner-cube reflector 40 into focus, the corner-cube reflector 40 is reliably brought into focus by determining that the aforementioned first object distance is valid. This is because the object distance between the automatic level 10 and either arm 62a of the frame 62 is regarded as the aforementioned first object distance, and the object distance between the automatic level 10 and a telescope's image reflected on the corner-cube reflector 40 is regarded as the aforementioned second object distance.

In order to achieve such a control method, each line sensor 21c has the entire distance-measuring zone (focus detection zone) Z which includes a series of photoelectric converting elements 21d (fifty-three photoelectric converting elements in total in this particular embodiment). Furthermore, each line sensor 21c is provided with five distance-measuring zones (selecting zones), i.e., first through fifth distance-measuring zones Z1, Z2, Z3, Z4 and Z5 arranged on the entire distance-measuring zone Z. The third distance-measuring zones Z3 is positioned at the center of the entire distance-measuring zone Z. Accordingly, the autofocusing system of the automatic level 10 can perform not only a normal autofocusing operation, i.e. a single-point autofocusing operation, in which the amount of defocus is calculated on the entire distance-measuring zone Z on each line sensor 21c but also a multi-point autofocusing operation in which the amount of defocus is calculated on each of the five distance-measuring zones Z1 through Z5 on each line sensor 21c. In other words, the autofocusing system constitutes a multi-point distance-measuring device. The arrangement of the five distance-measuring zones Z1 through Z5 on the entire distance-measuring zone Z is determined so that each distance-measuring zone overlaps one or two adjacent distance-measuring zones by an amount corresponding to a predetermined number of photoelectric converting elements 21d (three photoelectric converting elements 21d in this particular embodiment) to make it possible to reliably detect an edge of an object image that is formed in the vicinity of any one of the borders between two adjacent distance-measuring zones. Each of the first through fifth distance-measuring zones Z1, Z2, Z3, Z4 and Z5 is composed of thirteen photoelectric converting elements 21d in this particular embodiment. It should be noted that the distance-measuring zones Z1 through Z5 are not those which are mechanically or optically divided but those arranged on pixels which output AF sensor data used for the autofocusing operation among the whole AF sensor data output from each line sensor 21c.

The processing/control circuit 23 is connected to an AF start switch (AF start operational button) 27 which is positioned on the body of the automatic level 10. The processing/control circuit 23 is connected to an AF/MF selector switch (AF switch) 29 positioned on the body of the automatic level 10. The AF/MF selector switch 29 is in an ON state when the AF Mode is selected, while the AF/MF selector switch 29 is in an OFF state when the MF (manual focusing) Mode is selected. The AF start switch 27 is a self-reset push button switch. The autofocusing process starts upon the AF start switch 27 being manually depressed, i.e., upon the AF start switch 27 being turned ON from OFF. In the autofocusing process, the processing/control circuit 23 drives the AF motor 31 via the AF-motor drive circuit 25 in accordance with the calculated number of AF pulses which has been registered in the AF pulse counter 23a and the determined driving direction of the AF motor 31. Rotation of the AF motor 31 is transmitted to the pinion 12b via the clutch-incorporated reduction mechanism 32 to move the focusing lens group 12. Rotation of the AF motor 31 is detected by the encoder 30 while the output of the encoder 30 is counted by the processing/control circuit 23 to control the rotational speed of the AF motor 31 or stop the AF motor 31 in accordance with the counted output value and the calculated amount of driving the AF motor 31.

The processing/control circuit 23 controls the focus state detecting system 20 and the focusing lens group driving system 30 to detect the focus state of the object image formed on the reference focal plane 14A and subsequently moves the focusing lens group 12 along the optical axis O to bring the sighting object into focus.

An embodiment of the autofocusing operation performed in the automatic level 10 will be hereafter discussed in detail with reference to FIGS. 2 through 5. This autofocusing operation is performed by the processing/control circuit 23 in a state wherein a battery (not shown) for supplying power to the automatic level 10 is loaded in the automatic level 10.

Immediately after the battery is loaded in the automatic level 10, the processing/control circuit 23 initializes the RAM 24 and each of input/output ports (not shown) at step S101 and subsequently performs a power down process. Thereafter, the operation at step S101 is not performed again unless the battery is taken out of the automatic level 10 and re-loaded therein.

The power down process is a "stand-by process" which waits for the AF start switch 27 to be operated with all the circuits except for the processing/control circuit 23 being turned OFF while the AF start switch 27 is not operated, and turns the power ON to perform the autofocusing process (step S205) upon the AF start switch 27 being turned ON.

In the power down process, all the flags regarding the autofocusing operation are set to zero (step S111). The flags regarding the autofocusing operation include an in-focus flag which indicates that an in-focus state has been obtained, an autofocus NG flag (AFNG flag) that indicates that an in-focus state could not be obtained, a re-integral flag that indicates that the integrating operation has been performed after an in-focus state has been obtained, a currently searching flag and an overlapping operation flag indicating that each integrating operation has been performed while the focusing lens group 12 continues to move, a defocus OK flag indicating that a valid amount of defocus has been obtained, and a zone selection flag indicating that a distance-measuring zone has been selected.

After the operation at step S111 is completed, it is determined whether the AF start switch 27 is ON (step S113). Since the AF start switch 27 is OFF in an initial state wherein the AF start switch 27 has not been operated, an AF-start-switch memory (not shown) which is built into the processing/control circuit 23 is turned OFF; i.e., OFF-information is stored in the AF-start-switch memory (step S115). Thereafter it is determined whether the power is ON (step S119). Since the power is OFF in an initial state wherein the AF start switch 27 has not been operated, control returns to step S113, so that the operations S113, S115 and S119 are repeatedly performed until the AF start switch 27 is operated.

If it is determined at step S113 that the AF start switch 27 is turned ON, it is determined whether the AF-start-switch memory is ON, i.e, it is determined whether ON-information has been stored in the AF-start-switch memory (step S117). If the AF-start-switch memory is OFF (the AF-start-switch memory is OFF when control first enters the operation at step S117 after it is determined at step S113 that the AF start switch 27 is turned ON), the AF-start-switch memory is turned ON, i.e., ON-information is written into the AF-start-switch memory (step S123). Thereafter the state of the AF/MF selector switch 29 is checked to determine whether AF Mode is selected (steps S125 and S127). If it is determined at step S127 that the power is ON (i.e., AF Mode is currently selected), power is supplied to each circuit (step S129), and thereafter control proceeds to VDD loop process shown in FIG. 3. If it is determined at step S127 that the power is OFF (i.e., MF Mode is currently selected), control returns to the power down process.

The AF-start-switch memory is ON when control returns to the power down process, so that control proceeds to step S121 via the operations at steps S113, S117 and S119 to turn the power OFF if the AF start switch 27 is ON, and control waits for the AF start switch 27 to be turned ON. If the AF start switch 27 is OFF, control proceeds from step S113 to step S115 wherein OFF-information is written into the AF-start-switch memory, and subsequently the power is turned OFF (step S121). Thereafter control waits for the AF start switch 27 to be turned ON.

Figure 2:
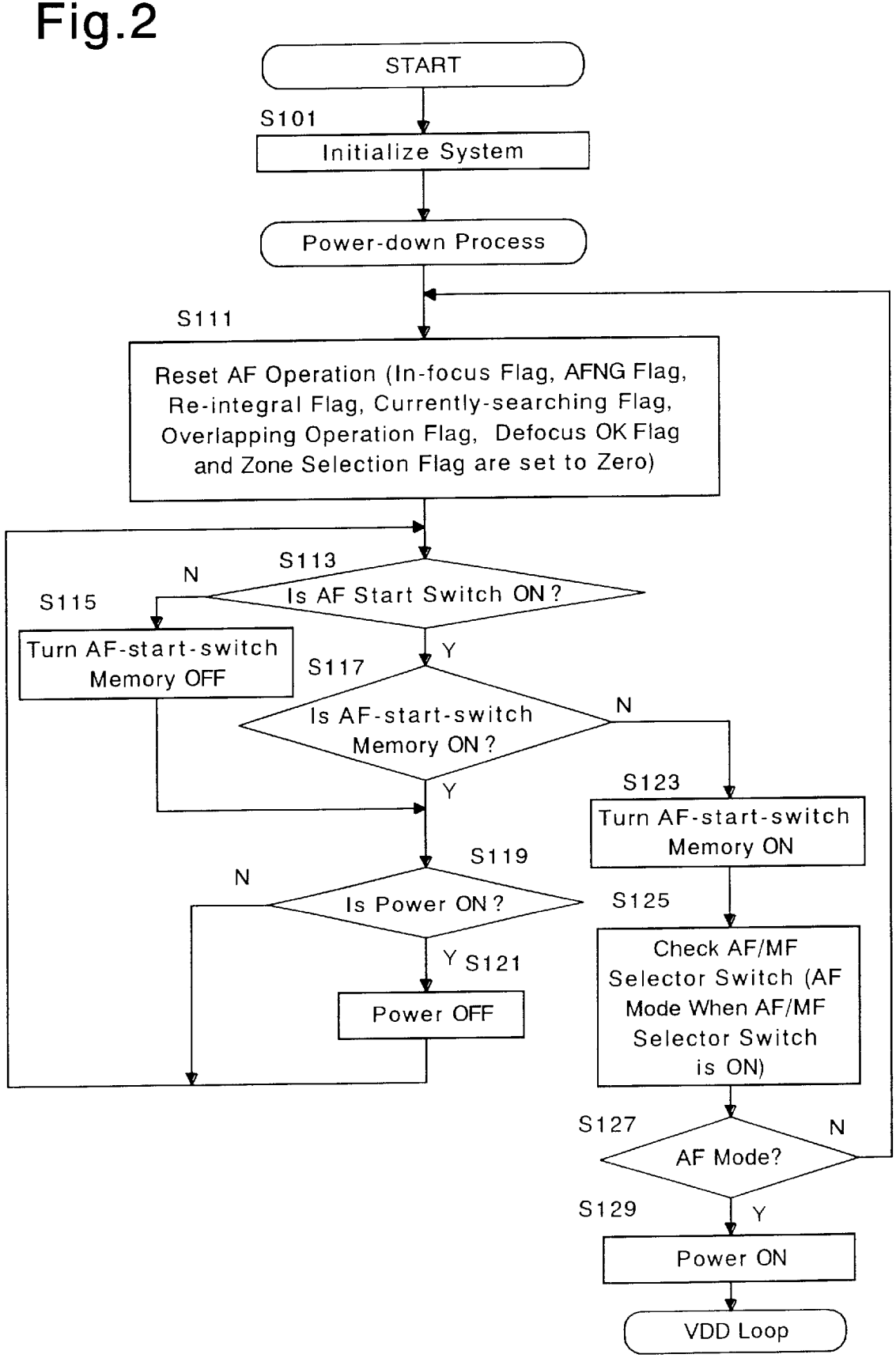
FIG. 2 is a flow chart showing part of the autofocusing operation (START) that is performed in the automatic level shown in FIG. 1.
Figure 3:
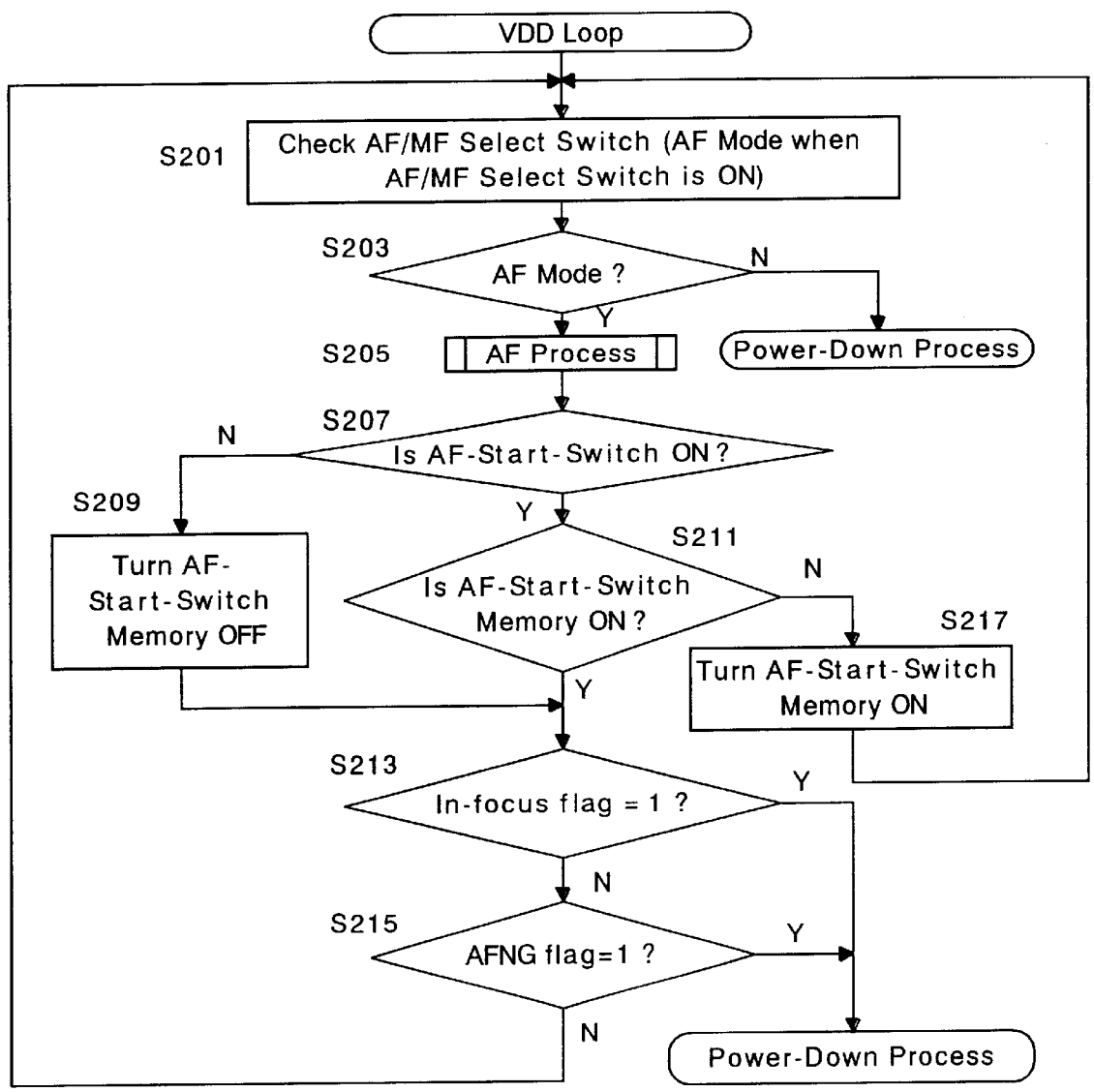
FIG. 3 is a flow chart showing another part of the autofocusing operation (VDD LOOP) that is performed in the automatic level shown in FIG. 1.
Figure 4:
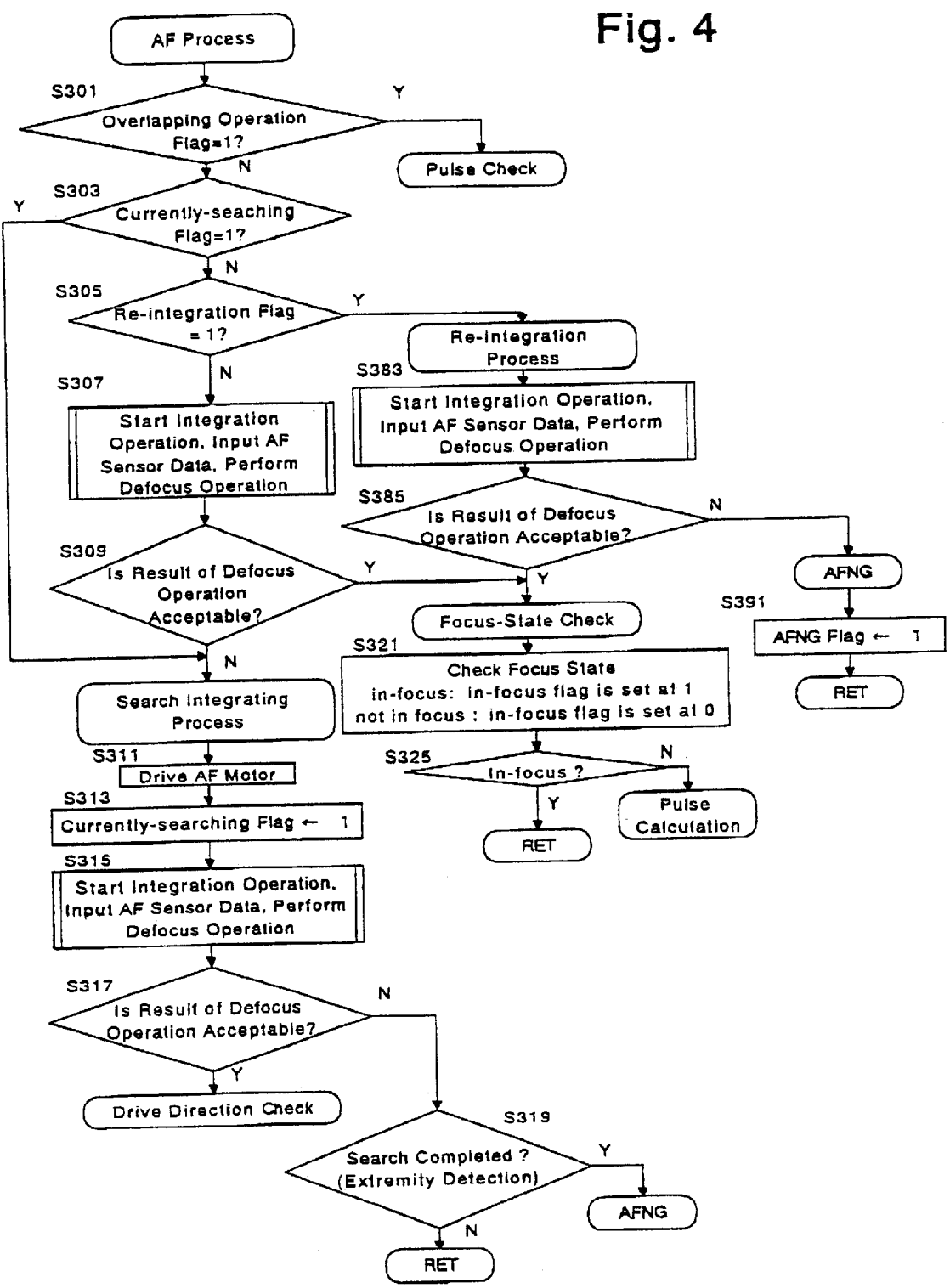
FIG. 4 is a flow chart showing another part of the autofocusing operation (AF PROCESS) that is performed in the automatic level shown in FIG. 1.
Figure 5:
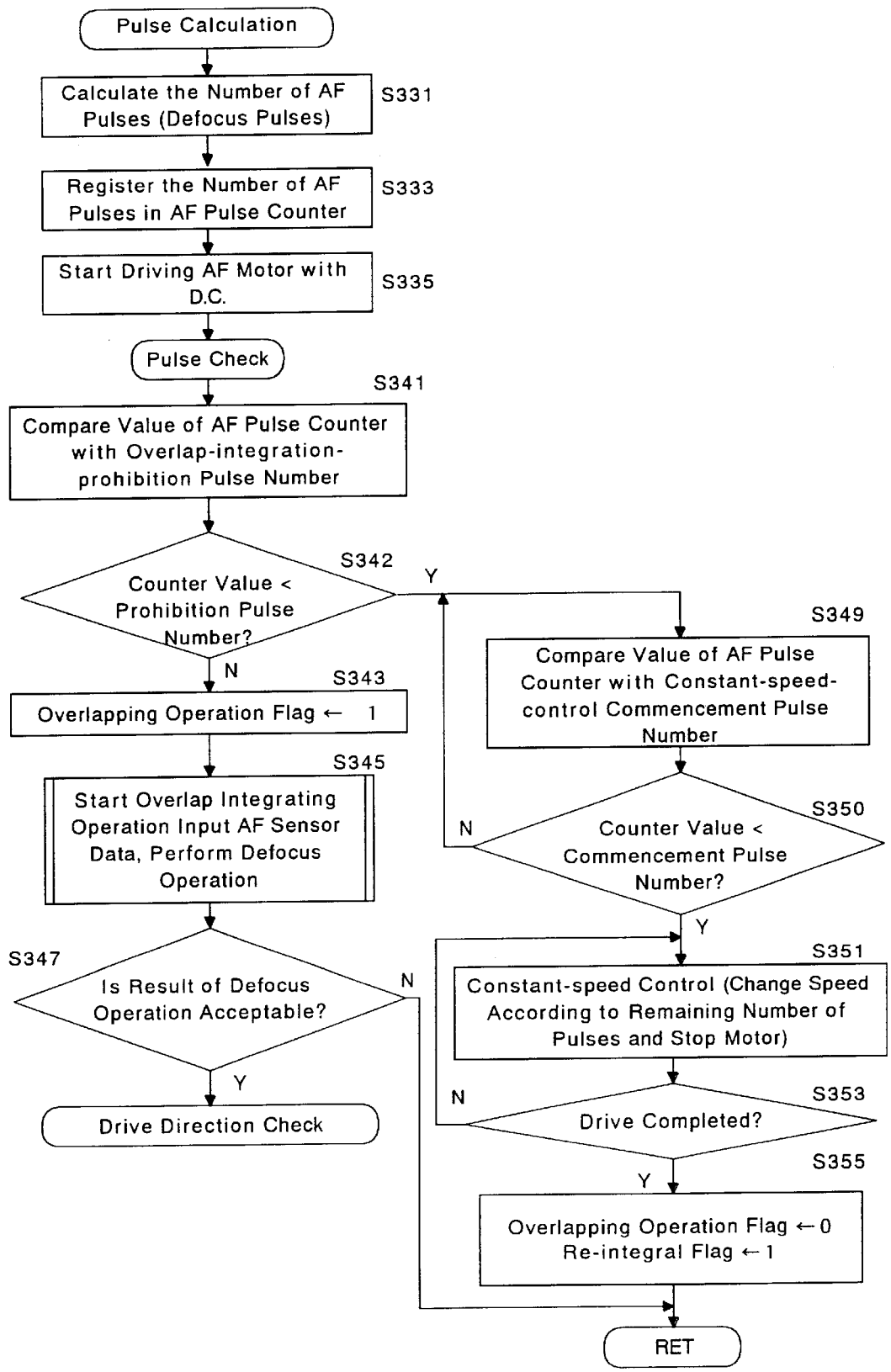
FIG. 5 is a flow chart showing another part of the autofocusing operation (PULSE CALCULATION) that is performed in the automatic level shown in FIG. 1.
Figure 6:
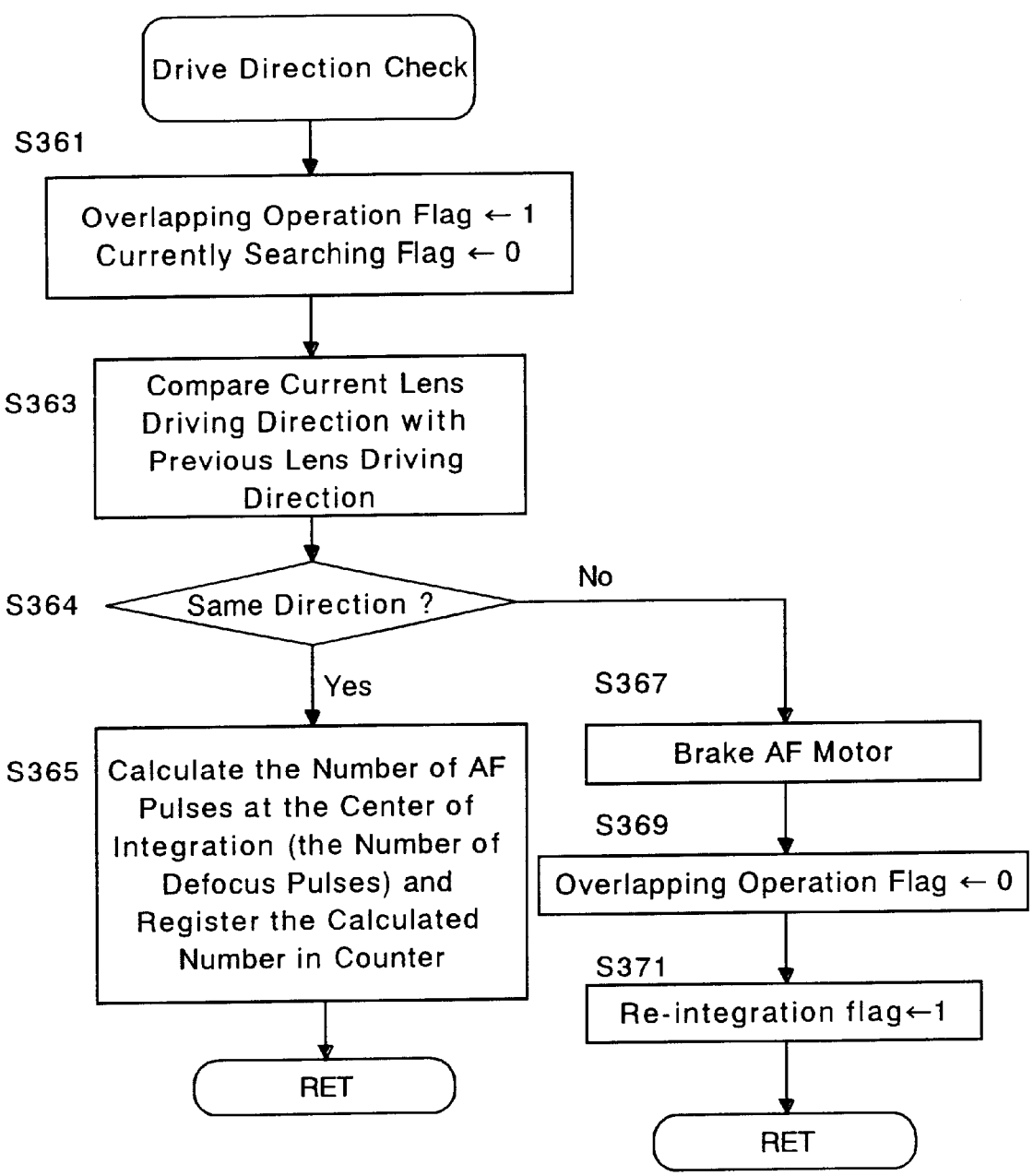
FIG. 6 is a flow chart showing another part of the autofocusing operation (DRIVE-DIRECTION CHECK) that is performed in the automatic level shown in FIG. 1.

In the VDD loop process, the autofocusing process (step S205) is performed, and control returns to the power down process shown in FIG. 2 upon determining that an in-focus state is obtained, or that it is impossible to obtain an in-focus state, and checking the state of the AF start switch 27. In the VDD loop process, the state of the AF/MF selector switch 29 is again checked to determine whether AF Mode is selected (steps S201 and S203). Control enters the autofocusing process at step S205 if AF Mode is selected. Control enters the power down process if MF Mode is selected. The following discussion will be made on the assumption that the AF/MF selector switch 29 is ON (i.e., AF Mode is selected).

If the AF/MF selector switch 29 is ON, the autofocusing process is performed in which the amount of defocus is detected to move the focusing lens group 11 to an in-focus position thereof (step S205). After the autofocusing process at step S205, it is determined at regular intervals in the VDD loop process whether the AF start switch 27 is ON (step S207). Since the AF start switch 27 generally remains ON when control first enters the operation at step S207, it is determined whether the AF-start-switch memory is ON (step S211). Since the AF-start-switch memory has been turned ON at step S123, the state of each of the in-focus flag and the autofocus NG flag is checked (steps S213, S215).

If it is impossible to determine either that an in-focus state has been obtained or that an in-focus state cannot be obtained in the autofocusing process at step S205, the in-focus flag and the AFNG flag are zero, so that control returns to the process at step S201 (steps S213 and S215).

Thereafter, the operations at steps S201, S203, S205, S207, S213 and S215 are repeatedly performed until either the in-focus flag or the autofocus NG flag is set to one, however, control proceeds from step S207 to step S209 to turn the AF-start-switch memory OFF if the AF start switch 27 is turned OFF and subsequently control returns to step S201 via the operations at steps S213 and S215.

In general, the focusing lens group 12 is moved to an in-focus position thereof by the autofocusing process at step S205, so that the in-focus flag is set to one and therefore control returns to the power down process (step S213) and subsequently the autofocusing operation completes (step S111). If an in-focus state cannot be obtained due to reasons such as, for example, the sighting object is not still, the sighting object is too dark, and/or that the contrast of the sighting object is too low; the autofocus NG flag is set to one in the autofocusing process at step S205, so that control proceeds from step S215 to the power down process to end the autofocusing operation.

After control returns to the power down process, if the AF start switch 27 is ON, the AF-start-switch memory is ON, so that control proceeds from the operation at step S113 to step S121 via the operations at steps S117 and S119 to turn the power OFF. Conversely, if the AF start switch 27 is OFF, control proceeds from the operation at step S113 to step S115 to write OFF-information into the AF-start-switch memory, and subsequently control proceeds from the operation at step S119 to step S121 to turn the power OFF and waits for the AF start switch 27 to be turned ON.

After control returns to the power down process, whether the AF start switch 27 is ON or OFF, control continues supplying power to the processing/control circuit 23, but stops supplying power to all the peripheral circuits thereof.

If the AF start switch 27 is turned ON after being turned OFF during the VDD loop process, control proceeds from step S207 to step S211. However, since the AF-start-switch memory is OFF when control first enters the operation at step S211, control proceeds from step S211 to step S217 to write ON-information into the AF-start-switch memory. Thereafter control returns to step S201 to perform the loop from step S201 and returning to step S201 via S203, S205, S207, S211, S213 and S215.

As can be understood from the foregoing, once the AF start switch 27 is turned ON, the autofocusing process is repeatedly performed until it is determined that an in-focus state is obtained, or that it is impossible to obtain an in-focus state. If the AF/MF select switch is turned OFF during the VDD loop process, control proceeds from the operation at step S203 to the power down process to end the autofocusing operation.

The autofocusing process at step S205 will be hereinafter discussed in detail with reference to the flow charts shown in FIGS. 4 through 9. In the autofocusing process, it is determined whether each of the overlapping operation flag, the currently searching flag and the re-integral flag is zero (steps S301, S303 and S305). When control first enters the autofocusing process, control proceeds to step S307 via steps S301, S303 and S305 since the overlapping operation flag, the currently searching flag and the re-integral flag have been all initialized to be zero at step Sill. At step S307, the AF sensor 21 is controlled to start integrating (accumulating) electric charge and subsequently the result of the integrating operation is input to the processing/control circuit 23 as AF sensor data to perform the predetermined defocus operation (step S307).

Subsequently, it is determined whether the result of the predetermined defocus operation is acceptable (step S309).

The result of the predetermined defocus operation may be unacceptable if the contrast of the sighting object is too low, the sighting object has a repeating pattern and/or the luminance of the sighting object is too low. In most cases, the result of the predetermined defocus operation is acceptable, therefore the case wherein the result of the predetermined defocus operation is acceptable will be first discussed hereinafter.

If it is determined at step S309 that the result of the predetermined defocus operation is acceptable, control enters the focus-state checking process in which it is determined whether an in-focus state is obtained, the in-focus flag is set to one if an in-focus state is obtained while the in-focus flag is set to zero if an in-focus state is not obtained (step S321). In the present embodiment, it is determined by the processing/control circuit 23 that an in-focus state is obtained when the amount of defocus is equal to or less than a predetermined amount of defocus. Control returns to the VDD loop process to perform the operations at and after step S207 if an in-focus state is obtained. Control proceeds to the pulse calculation process (FIG. 5) if an in-focus state is not obtained.

In the pulse calculation process, the amount of driving of the AF motor 31 (i.e., the number of pulses output from the encoder 33) that is necessary for moving the focusing lens group 12 to an axial position thereof, wherein the amount of defocus becomes zero, is calculated in accordance with an acceptable result of a defocus operation.

In the pulse calculation process, firstly the amount of driving of the AF motor 31 (the number of AF pulses) and the driving direction thereof are respectively calculated and determined in accordance with the calculated amount of defocus (step S331). Subsequently, the number of AF pulses calculated in the operation at step S331 is registered in the AF pulse counter 23a (step S333), and subsequently the AF motor 31 is driven with direct current (step S335). Subsequently control enters the pulse check process. The value of the AF pulse counter 23a is decreased by one each time an AF pulse is output from the encoder 33.

In the pulse check process, the drive speed of the AF motor 31 is controlled in accordance with the value of the AF pulse counter 23a. More specifically, if the value of the AF pulse counter 23a is larger than a predetermined overlap-integration prohibition pulse number, the AF motor 31 is driven at a faster speed to move the focusing lens group 12 to an axial position thereof at which an in-focus state is obtained in a shorter period of time, and at the same time, an overlap integration is also performed. Once the value of the AF pulse counter 23a becomes smaller than the predetermined overlap-integration prohibition pulse number, the AF motor 31 continues to be driven at the faster speed, however the overlap integration is stopped. Subsequently, if the value of the AF pulse counter 23a becomes less than a predetermined constant-speed-control commencement pulse number, the AF motor 31 is driven at a slow speed with PWM (pulse width modulation) control so that the focusing lens group 12 does not overrun, and thereafter the AF motor 31 is stopped upon the value of the AF pulse counter 23a reaching zero.

In the pulse check process, the value of the AF pulse counter 23a is compared with the predetermined overlap-integration prohibition pulse number (step S341), and subsequently it is determined whether the value of the AF pulse counter 23a is smaller than the predetermined overlap-integration prohibition pulse number (step S342). If the value of the AF pulse counter 23a is equal to or greater than the predetermined overlap-integration prohibition pulse number, the overlapping operation flag is set to one (step S343). Subsequently, the overlap integrating operation starts, the AF sensor data is input from the AF sensor 21, and the predetermined defocus operation is performed (step S345). Thereafter, it is determined whether the result of the predetermined defocus operation is acceptable (step S347). If the predetermined defocus operation is acceptable, control proceeds to drive-direction check process shown in FIG. 6. If the predetermined defocus operation is unacceptable, control returns.

In the drive-direction check process, the number of AF pulses is calculated in accordance with the AF sensor data obtained by the integrating operation performed during the driving of the AF motor 31, and subsequently the calculated number of AF pulses is registered in the AF pulse counter 23a. However, the AF motor 31 is braked, stopping movement thereof, if the direction of driving of the AF motor 31 changes. In the present embodiment, when braking the AF motor, the processing/control circuit 23 short-circuits both terminals of the AF motor 31 to stop the rotation thereof.

In the drive-direction check process, the overlapping operation flag is set to one while the currently-searching flag is set to zero (step S361). Subsequently, the current direction of driving of the AF motor 31 is compared with the previous direction of driving of the AF motor 31 in accordance with the result of the predetermined defocus operation (step S363). Subsequently, it is determined whether the current direction of driving of the AF motor 31 is the same as the previous one (step S364). If the current direction of driving of the AF motor 31 is the same as the previous one (which is often the case), the number of AF pulses at the center of integration is calculated and registered in the AF pulse counter 23a (step S365), and subsequently control returns. If the current direction of driving of the AF motor 31 changes, the AF motor 31 is braked to stop the rotation thereof (step S367), the overlapping operation flag is set to zero (step S369) and the re-integral flag is set to one (step S371). Thereafter control returns.

Upon returning to the VDD loop process, control re-enters the AF process at step S205 after performing the operation at step S207 and operations thereafter. During the time the direction of driving of the AF motor 31 does not change, the overlapping operation flag remains at one, so that control enters the pulse check process from step S301. Thereafter, control continues returning to the pulse check process until the value of the AF pulse counter 23a becomes less than the predetermined overlap-integration prohibition pulse number via the operations at steps S341, S342, S343, S345, S347, S361, S363, S364 and S365.

Thereafter, during this process the number of AF pulses generally reduces and finally becomes less than the predetermined overlap-integration prohibition pulse number, thereby control proceeds from the operation at step S342 to step S349.

In the operations from steps S349 through S355, driving of the AF motor 31 by an amount corresponding to the calculated number of AF pulses is ended in order to stop the AF motor 31. The value of the AF pulse counter 23a (the number of AF pulses) is compared with the predetermined constant-speed-control commencement pulse number (step S349), and subsequently it is determined whether the value of the AF pulse counter 23a is smaller than the predetermined constant-speed-control commencement pulse number (step S350). If the value of the AF pulse counter 23a is equal to or greater than the predetermined constant-speed-control commencement pulse number, control returns to step S349. Namely, due to the operations at steps S349 and S350, control waits for the number of AF pulses to be less than the predetermined constant-speed-control commencement pulse number. Subsequently, if it is determined at step S350 that the value of the AF pulse counter 23a is less than the predetermined constant-speed-control commencement pulse number, the AF motor 31 is driven at a slow speed with PWM control in accordance with the remaining number of AF pulses, and subsequently the AF motor 31 is stopped upon the value of the AF pulse counter 23a becoming zero (steps S351 and S353). Subsequently, immediately after the AF motor 31 stops, the overlapping operation flag is set to zero and at the same time the re-integral flag is set to one (step S355). Thereafter control returns to the VDD loop process.

If control enters the autofocusing process at step S205 after returning to the VDD loop process, the overlapping operation flag is zero while the re-integral flag is one, so that control enters the re-integration process from step S305. This is also true in the case where it is determined at step S363 that the current direction of driving of the AF motor 31 changes from the previous direction.

In the re-integration process, the predetermined defocus operation is performed again, and subsequently it is determined whether the result of the defocus operation is acceptable or not. In the re-integration process, the AF sensor 21 is controlled to start integrating (accumulating) electric charge, and subsequently, the results of the integrating operation are input to the processing/control circuit 23 via the preamplifier 22 as AF sensor data to perform the predetermined defocus operation (step S383). Subsequently, it is determined whether the result of the predetermined defocus operation is acceptable (step S385).

If it is determined at step S385 that the result of the predetermined defocus operation is acceptable, control enters the focus-state checking process which starts from the operation step S321. If the result of the predetermined defocus operation is unacceptable, control enters the AFNG process in which the AFNG flag is set to one (step S391) and subsequently control returns to the VDD loop process, so that control proceeds from the operation at step S215 to the power down process to end the autofocusing operation and wait for the AF start switch 27 to be operated.

The above illustrated process is directed to the case where the sighting object can be brought into focus. If it is difficult or impossible to bring the sighting object into focus, control also returns to the power down process via the VDD loop process to end the autofocusing operation.

The autofocusing process will be hereinafter discussed in the case where it is difficult or impossible to bring the sighting object into focus. Upon entering the autofocusing operation, control performs, via the operations at steps S301, S303 and S305, the operation at step S307 in which the AF sensor 21 starts integrating (accumulating) electric charge while the results of the integrating operation is input to the processing/control circuit 23 as AF sensor data to perform the predetermined defocus operation. If it is determined at step S309 that the result of the predetermined defocus operation is unacceptable, control enters the search-integrating process.

In the search-integrating process, the predetermined defocus operation and the integrating operation are performed while driving the AF motor 31 to move the focusing lens group 12 from the focal point of an object at the closet photographic distance to the focal point of an object at infinity, so as to obtain an acceptable result of a defocus operation. If an acceptable result of a defocus operation cannot be obtained through the search-integrating process, the AFNG flag is set to one and control returns. Thereafter, control proceeds from the operation at step S215 to the power down process.

In the search-integrating process, the AF motor 31 is driven in order to search an in-focus point, initially in the direction of bringing an object of a near distance into focus (step S311). Subsequently, the currently searching flag is set to one (step S313). Subsequently, the AF sensor 21 is controlled to start integrating (accumulating) electric charge, and the results of the integrating operation are input to the processing/control circuit 23 as AF sensor data to perform the predetermined defocus operation (step S315). Subsequently, it is determined whether the result of the predetermined defocus operation is acceptable (step S317). If the result of the predetermined defocus operation is acceptable, control enters the drive-direction check process. If the result of the predetermined defocus operation is unacceptable, it is determined whether the focusing lens group 12 is currently positioned at the infinity position thereof (step S319). If the focusing lens group 12 is currently positioned at a position other than the infinity position, control returns to the VDD loop process to perform the operations at and after step S207. If the focusing lens group 12 is currently positioned at the infinity extremity, control enters the AFNG process in which the AFNG flag is set to one (step S391). Subsequently, control returns to the VDD process to perform the operation at step S207 and operations thereafter. In the AF-motor driving operation (search-driving operation) at step S311, firstly the AF motor 31 is driven to search an in-focus point in the direction of bringing an object of a near distance into focus as noted above, and secondly, the AF motor 31 is driven reverse to search the same immediately after the focusing lens group 12 reaches the closest distance extremity thereof and stops. Thirdly, the AF motor 31 is stopped immediately after the focusing lens group 12 reaches the infinity distance extremity thereof and stops. Once an acceptable result of a defocus operation is obtained during the search-integrating process, control returns to the operation in which the AF motor 31 is driven in accordance with the obtained amount of defocus.

If control again enters the AF process at step S205 after returning to the VDD loop process, the overlapping operation flag is zero while the currently-searching flag is one, so that control enters the search-integrating process from the operation at step S303 to perform the search-integrating process at step S311 and operations thereafter. If an acceptable amount of defocus cannot be obtained even if the focusing lens group 12 reaches the infinity distance extremity thereof, control enters the AFNG process in which the AFNG flag is set to one, and subsequently control returns. Thereafter, control proceeds from the operation at step S215 to the power down process.

Although the above illustrated process is directed to the case wherein an acceptable result of the predetermined defocus operation cannot be obtained from the start, if an acceptable result of the predetermined defocus operation can be obtained once, but an in-focus state cannot be obtained, and subsequently an acceptable result of the predetermined defocus operation cannot be obtained in the re-integration process even after the focusing lens group is driven, control proceeds from step S385 to the AFNG process in which the AFNG flag is set to one and subsequently control returns to the VDD loop process. Thereafter control proceeds from step S215 to the power down process.

The defocus operation process performed at each of the operations at steps S307, S315, S345, S383 and S345 will be hereinafter discussed in detail with reference to FIGS. 7, 8 and 9. In this embodiment, the contrast of an image formed on each line sensor 21c is determined on each of the five distance-measuring zones Z1, Z2, Z3, Z4 and Z5. Thereafter, among the distance-measuring zones having obtained a sufficient contrast, if it is determined that two object distances respectively measured on two distance-measuring zones which are separate from each other, with at least one distance-measuring zone positioned between the two separate distance-measuring zones, are substantially the same as each other, and that the object distance measured on at least one distance-measuring zone positioned between the two separate distance-measuring zones is substantially double that of each of the aforementioned two object distances which are substantially the same, each of the two identical object distances is regarded as a valid object distance so that the autofocusing operation is performed in accordance with the valid object distance. The comparison of the object distances is performed by the processing/control circuit (controller) 23.

In the defocus operation process, firstly a contrast calculation is performed in accordance with the AF sensor data output from the entire distance-measuring zone Z (step S401). In this calculation, for instance, regarding the reference line sensor 21c, the sum of each absolute value of the difference between the integral values of two adjacent pixels (photoelectric converting elements) in the distance-measuring zone is used. If it is determined that there is insufficient contrast (step S403), the defocus OK flag and the zone selection flag are respectively set to zero (step S429) and subsequently control returns.

The defocus OK flag indicates that a valid amount of defocus has been obtained, and the zone selection flag indicates that a distance-measuring zone has been selected.

If it is determined at step S403 that there is a sufficient contrast whose value is greater than a predetermined value (first predetermined value), it is determined whether the zone selection flag is one, namely, whether a distance-measuring zone has been selected (step S405). As a distance-measuring zone has not been selected when control first enters the operation at step S405, a correlation operation (calculation for determining a phase-difference) is performed using the AF sensor data output from the entire distance-measuring zone Z to determine a phase difference (object distance data) (step S407). Subsequently, it is determined whether a valid phase difference could be obtained in the operation at step S407 (step S409). If a valid phase difference could not be obtained, control proceeds to step S429 wherein the defocus OK flag and the zone selection flag are respectively set to zero, and subsequently control returns. The correlation operation cannot be performed if no coincident point cannot be detected between two images respectively formed on the pair of the entire distance-measuring zone Z (i.e., the pair of line sensors 21c), e.g., if the two images are badly blurred.

If it is determined at step S409 that a valid phase difference could be obtained, it is determined whether the value of the obtained phase difference is smaller than a predetermined value, i.e., whether the amount of defocus is small (step S411). If it is determined at step S411 that the value of the obtained phase difference is equal to or greater than the predetermined value (i.e., the amount of defocus is large), control proceeds to the interpolation calculation operation of step S421 wherein an amount of defocus is calculated, without selecting any of the five distance-measuring zones Z1 through Z5. Subsequently, the defocus OK flag is set to one (step S423) and then control returns. Accordingly, as long as the value of the obtained phase difference is equal to or greater than the predetermined value, the operations at steps 401 through 411, step S421 and step S423 are repeatedly performed.

Once the value of the obtained phase difference becomes smaller than the predetermined value, control proceeds from the step S411 to the step S413. At step S413 the phase difference (object distance data) determined at step S407 is stored in a predetermined address of the RAM 24 to be temporarily stored therein (step S413), and subsequently the zone selecting/checking process (FIG. 8) is performed (step S415). In the zone selecting/checking process, on each distance-measuring zone Z1 through Z5 having obtained a contrast whose value is greater than a predetermined value (second predetermined value), the predetermined defocus operation is performed to determine an object distance in the order from the first through fifth distance-measuring zones Z1 through Z5, and subsequently valid distance-measuring zones are selected in accordance with the determined object distances to make the AF sensor data which is output from each valid distance-measuring zone.

After the zone selecting/checking process at step S415, it is determined whether any valid distance-measuring zone has been selected (step S417). If no valid distance-measuring zone is selected, the phase difference (data of correlation operation) temporarily stored in a predetermined address of the RAM 24 in the operation at step S413 is read out to calculate an amount of defocus in accordance with the phase difference (step S421). Subsequently, the defocus OK flag is set to one (step S423) and then control returns. If it is determined at step S417 that a valid distance-measuring zone has been selected, control proceeds from step S417 to step S423, so that the defocus OK flag is set to one, and then control returns.

Figure 7:
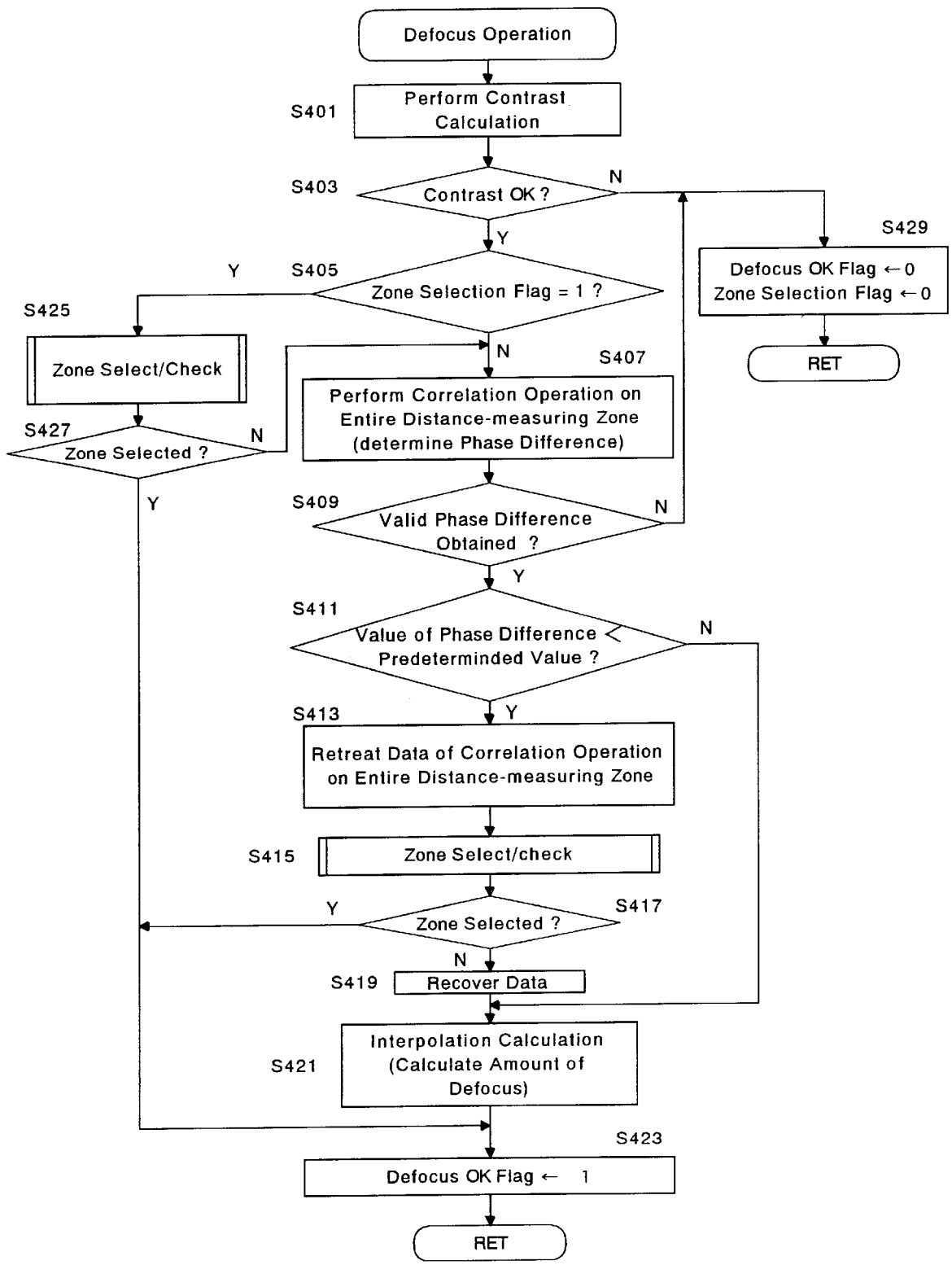
FIG. 7 is a flow chart showing another part of the autofocusing operation (DEFOCUS OPERATION) that is performed in the automatic level shown in FIG. 1.
Figure 8:
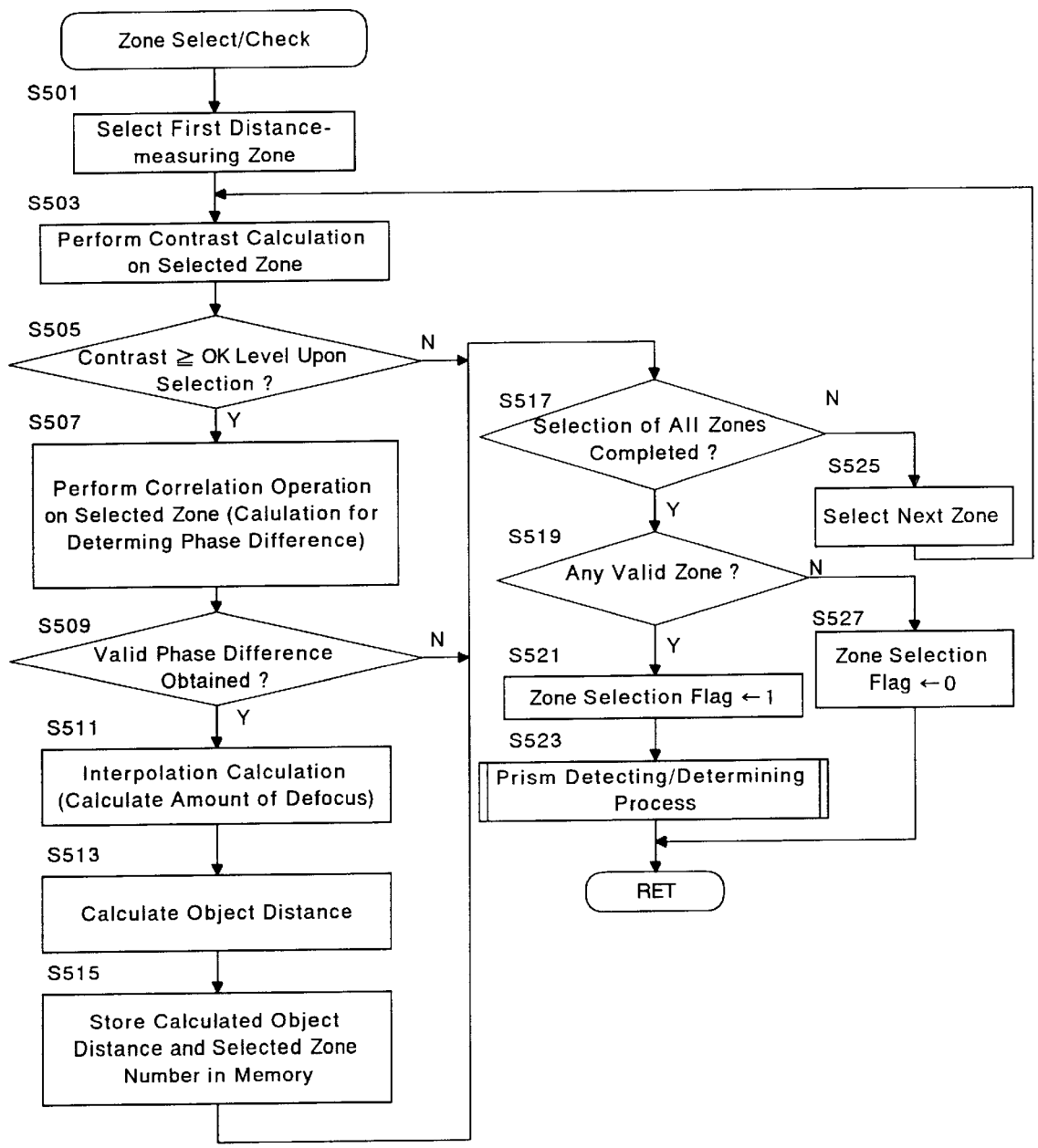
FIG. 8 is a flow chart showing another part- of the autofocusing operation (ZONE SELECTING/CHECKING) that is performed in the automatic level shown in FIG. 1.
Figure 9:
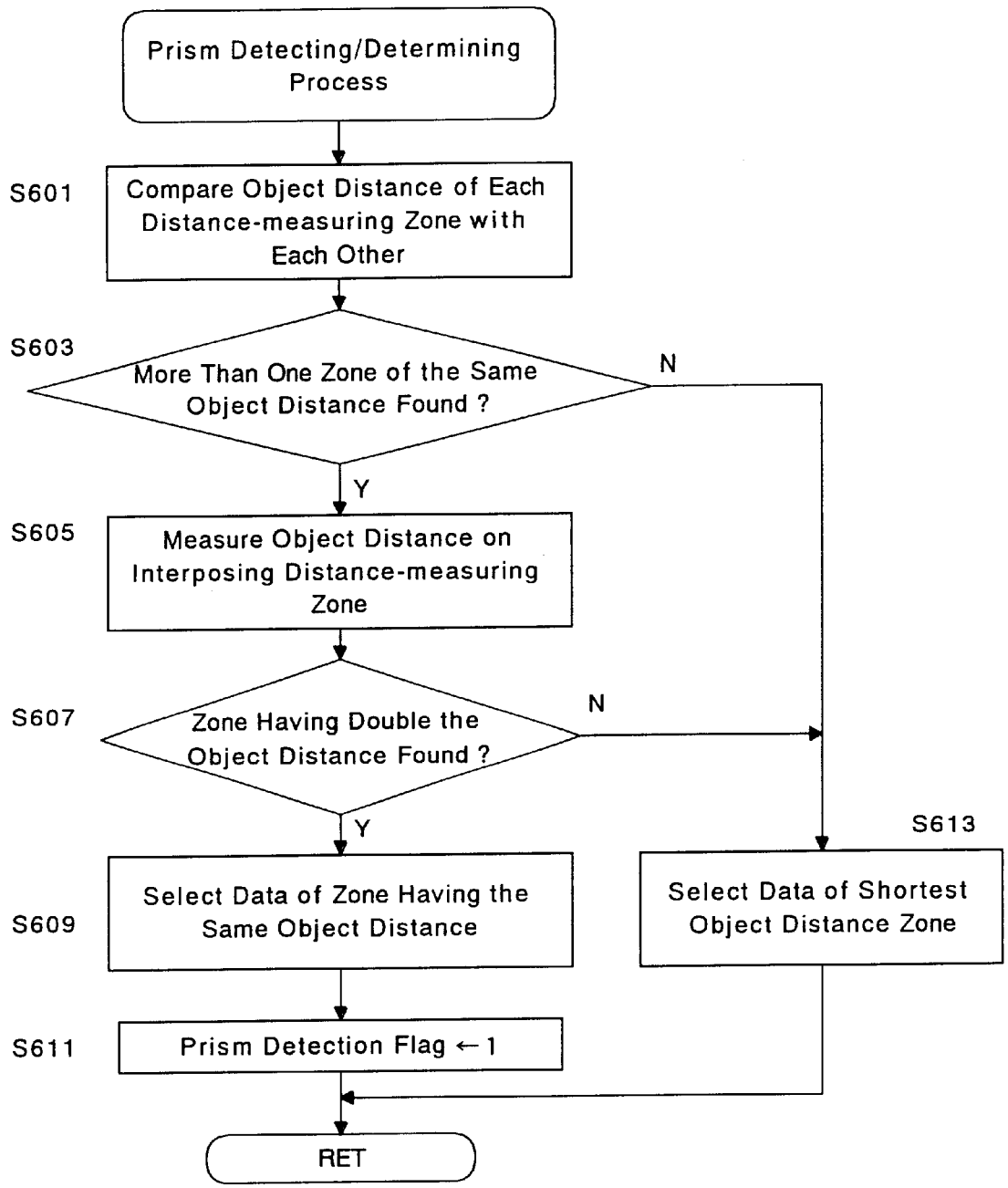
FIG. 9 is a flow chart showing another part of the autofocusing operation (PRISM DETECTING/DETERMINING) that is performed in the automatic level shown in FIG. 1.

If control re-enters the defocus operation process shown in FIG. 7 after any one of the five distance-measuring zones Z1 through Z5 has been selected (i.e., after the zone selection flag is set to one), control proceeds from step S405 to step S425 to perform the zone selecting/checking process shown in FIG. 8. Subsequently, it is determined whether any valid distance-measuring zone has been selected (step S427). If it is determined at step S427 that no valid distance-measuring zone is selected, control returns to step S407 so as to utilize the entire distance-measuring zone Z. If it is determined at step S427 that a valid distance-measuring zone has been selected, control proceeds to step S423, so that the defocus OK flag is set to one, and then control returns.

According to the defocus operation process mentioned above, on condition that a contrast greater than the aforementioned first predetermined value is obtained on the entire distance-measuring zone Z, an amount of defocus is calculated on each distance-measuring zone having obtained a contrast whose value is greater than the aforementioned second predetermined value in accordance with the AF sensor data output from the each distance-measuring zone.

The zone selecting/checking process performed at steps S415 and S425 will be hereinafter discussed in detail with reference to FIG. 8. In the zone selecting/checking process, firstly the first distance-measuring zone Z1 is selected (step S501) and subsequently the contrast of image on the selected first distance-measuring zone Z1 is calculated in accordance with the AF sensor data output therefrom, and the result of this calculation (contrast value) is stored in the RAM 24 (step S503).

Subsequently, it is determined whether the value of contrast stored in the RAM 24 at step S503 is equal to or greater than a predetermined value (second predetermined value) (step S505). If the value of contrast stored in the RAM 24 is equal to or greater than the second predetermined value, the correlation operation (calculation for determining a phase-difference) is performed using the AF sensor data output from the currently-selected distance-measuring zone (the first distance-measuring zone Z1 when control first enters the operation at step S507) to determine a phase difference (data of correlation operation) (step S507). Subsequently, it is determined whether a valid phase difference was obtained in the operation at step S507 (step S509). If a valid phase difference was obtained, an amount of defocus is calculated in accordance with the phase difference obtained in the operation at step S507 (step S511). Subsequently, in accordance with this calculated amount of defocus, an object distance is calculated (step S513). Subsequently, this calculated object distance is stored in a predetermined address in the RAM 24 together with the data representing the zone number of the currently-selected distance-measuring zone (step S515). Subsequently control proceeds to step S517. If it is determined at step S505 that the contrast value stored in the RAM 24 is less than the second predetermined value, control skips steps S507, S509, S511, S513 and S515 to proceed to step S517. Likewise, if it is determined at step S509 that a valid phase difference could not be obtained, control skips the operations at steps S511, S513 and S515 to proceed to step S517.

At step S517 it is determined whether all the five distance-measuring zones Z1 through Z5 have already been selected (i.e., whether the operations at steps S503 through S517 have already been performed on each of the five distance-measuring zones Z1 through Z5). If all the five distance-measuring zones Z1 through Z5 have not yet been selected, control proceeds from step S525 to step S503 to perform steps S503 through S517 for the subsequent distance-measuring zone. If all the five distance-measuring zones Z1 through Z5 have already been selected, control proceeds from step S517 to step S519.

It is determined at step S519 whether there is any distance-measuring zone on which a valid phase difference has been obtained. If there is a valid distance-measuring zone or zones, the zone selection flag is set to one (step S521) and subsequently control enters the prism detecting/determining process shown in FIG. 9 (step S523). Subsequently control returns. If it is determined at step S519 that there are no valid distance-measuring zones, the zone selection flag is set to zero (step S527) and subsequently control returns.

In the prism detecting/determining process, the object distances obtained from the distance-measuring zones each having obtained a valid phase difference are compared with each other. Thereafter, if it is determined that the two object distances (each first object distance) respectively measured on two distance-measuring zones which are separate from each other, by at least one distance-measuring zone positioned between the two separate distance-measuring zones, are identical to each other, and that the object distance (second object distance) measured on one of the aforementioned at least one distance-measuring zone positioned between the two separate distance-measuring zones is substantially double the aforementioned first object distance, the first object distance is regarded as a valid object distance.

In the prism detecting/determining process, firstly the object distances obtained from the distance-measuring zones each having obtained a valid phase difference are compared with each other (step S601). Subsequently, it is determined whether there is more than one distance-measuring zone wherein substantially the same object distance (the first object distance) has been measured (step S603). If it is determined that there is more than one distance-measuring zone wherein substantially the same object distance has been measured, it is determined whether there is a distance-measuring zone which interposes the detecting zones having substantially the same object distance, and has an object distance (the second object distance) substantially double the aforementioned first object distance (steps S605 and S607). If such a distance-measuring zone is found, the aforementioned first object distance is selected as a valid object distance (step S609), and subsequently the prism detection flag is set to one (step S611) and then control returns. If it is determined at step S607 that such a distance-measuring zone cannot be found, the AF sensor data output from the distance-measuring zone, wherein the shortest object distance is obtained, is selected (step S613); and subsequently control returns.

According to such a control method, if it is determined that the two object distances (each first object distance) respectively measured on two distance-measuring zones, which are separate from each other by at least one distance-measuring zone positioned between the two separate distance-measuring zones, are substantially the same as each other, and that the object distance (second object distance) measured on one of the aforementioned at least one distance-measuring zone positioned between the two separate distance-measuring zones is substantially double the aforementioned first object distance, the first object distance is regarded as a valid object distance. Therefore, the corner-cube reflector 40 can be reliably brought into focus when the automatic level 10 is aimed at the corner-cube reflector 40 mounted on the tripod 60.

In the present embodiment, particularly in the process at step S415, if it is determined that the two object distances (each first object distance) respectively measured on two distance-measuring zones which are separate from each other by at least one distance-measuring zone positioned between are substantially the same as each other, and that the object distance (second object distance) measured on one of the aforementioned at least one distance-measuring zone positioned between the two separate distance-measuring zones is substantially double the aforementioned first object distance, the first object distance is regarded as a valid object distance, so that the autofocusing operation is performed in accordance with the valid object distance as mentioned above. However, the automatic level 10 can be provided with a normal AF mode optionally selectable by the user in which the amount of defocus is calculated in accordance with only the amount of defocus obtained from the entire distance-measuring zone Z on the pair of line sensors 21c. In this case, the automatic level 10 can be provided on a body thereof with a select button or knob (not shown) which is manually operated to select either a multi-point AF mode or a normal AF mode. If the normal AF mode is selected, the defocus operation process shown in FIG. 7 has only to be modified so that control proceeds from step S409 to step S421 if it is determined at step S409 that a valid phase difference has been obtained.

In the illustrated embodiment, although a pair of multi-segment CCD sensors are used as the focus detecting sensor (AF sensor) 21, a pair of MOS (metal oxide semiconductor) line sensors can also be used as the focus detecting sensor 21.

In the illustrated embodiment, although each line sensor 21c is provided with five distance-measuring zones (the first through fifth distance-measuring zones Z1, Z2, Z3, Z4 and Z5), the present invention is not limited solely to this particular embodiment. It can be understood by those skilled in the art that each line sensor may be provided with at least three distance-measuring zones to obtain a similar effect.

In the above illustrated embodiment, the present invention is applied to an automatic level. However, the present invention can be applied to not only an automatic level, but also any other surveying apparatus such as a transit, a theodolite and a total station. Furthermore, the present invention can also be applied to any telescopic optical system such as a telescope and a binocular telescope.

As can be understood from the foregoing, according to the autofocusing apparatus to which the present invention is applied, the controller compares each object distance detected by the multi-point distance measuring device with each other; wherein if the controller determines that two object distances respectively detected on two distance-measuring zones among the aforementioned at least three distance-measuring zones are substantially the same and are separate from each other by at least one distance-measuring zone positioned therebetween; and that an object distance detected on one of the aforementioned at least one distance-measuring zone is substantially double the distance of each of the two object distances which are substantially the same, the controller determines that each of the two object distances is a valid object distance so that the autofocusing operation is performed in accordance with the valid object distance. Accordingly, the telescope can be focused reliably on a sighting object, especially a prism such as a corner-cube reflector.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. An autofocusing apparatus of a telescope for automatically focusing said telescope on an object viewed within a field of view of said telescope through a distance-measuring zone arranged in said field of view, said autofocusing apparatus comprising:

a multi-point distance measuring device which divides said distance-measuring zone into at least three distance-measuring zones to detect an object distance on each of said distance-measuring zones;

a lens driver which drives a focusing lens group of said telescope along an optical axis thereof; and a controller which controls said lens driver so that said focusing lens group is moved to perform an autofocusing operation in accordance with a result of said each object distance detected by said multi-point distance measuring zones;

wherein said controller compares said each object distance detected by said multi-point distance measuring device with each other of said each object distance; wherein if said controller determines that two object distances respectively detected on two distance-measuring zones among said at least three distance-measuring zones are substantially the same, said two distance-measuring zones being separate from each other by at least one distance-measuring zone positioned therebetween, and that an object distance detected on one of said at least one distance-measuring zone is substantially double the distance of each of said two object distances which are substantially the same, said controller determines that each of said two object distances is a valid object distance so that said autofocusing operation is performed in accordance with said valid object distance.

2. The autofocusing apparatus according to claim 1, wherein if there are no object distances detected on said at least one distance-measuring zone which are substantially double the distance of each of said two object distances, said controller determines the shortest object distance, among all of said object distances detected by said multi-point distance measuring device, as a valid object distance so that said autofocusing operation is performed in accordance with said shortest object distance.

3. The autofocusing apparatus according to claim 1, wherein said autofocusing apparatus is incorporated in a sighting telescope.

4. The autofocusing apparatus according to claim 1, further comprising a memory in which said object distances measured by said multi-point distance measuring device are temporarily stored.

5. The autofocusing apparatus according to claim 1, wherein said multi-point distance measuring device comprises a phase-difference detection AF sensor.

6. The autofocusing apparatus according to claim 5, wherein said phase-difference detection AF sensor comprises a pair of line sensors.

7. The autofocusing apparatus according to claim 1, wherein any two adjacent distance-measuring zones among said at least three distance-measuring zones overlap each other by a predetermined amount.

8. The autofocusing apparatus according to claim 1, wherein said distance-measuring zone extends horizontally along said field of view of said telescope.

* * * * *